June 4, 1968  J. A. HELMER  3,386,244
ROTOR OF HYDRODYNAMIC UNIT
Filed May 16, 1966
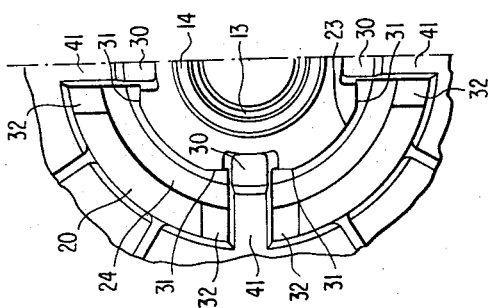
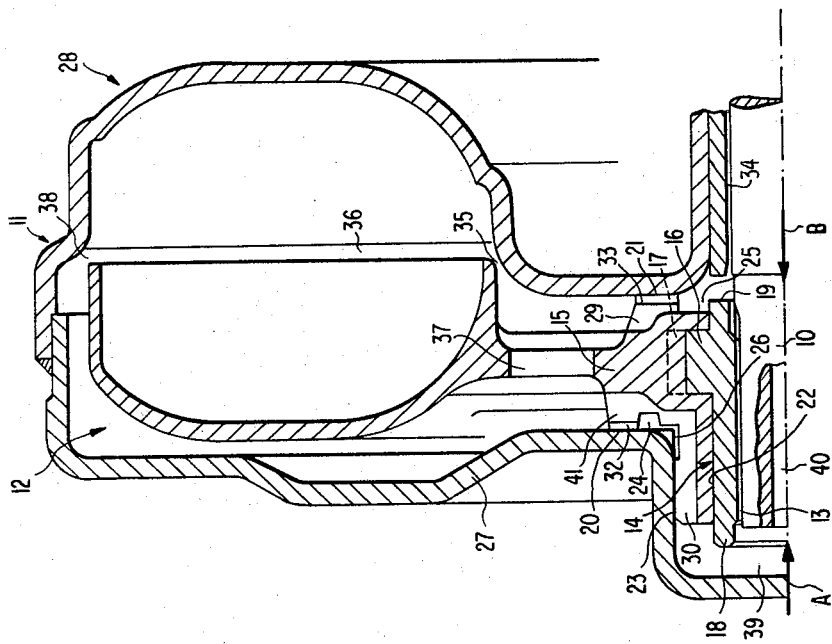
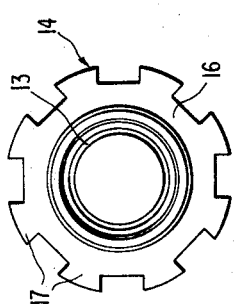
INVENTOR.
JOSEF A. HELMER
BY Dicke & Craig
ATTORNEYS

United States Patent Office 3,386,244
Patented June 4, 1968

3,386,244
ROTOR OF HYDRODYNAMIC UNIT
Josef A. Helmer, Aich, Kreis Nurtingen, Germany, assignor to Daimler-Benz Aktiengesellschaft, Stuttgart-Unterturkheim, Germany
Filed May 16, 1966, Ser. No. 550,364
Claims priority, application Germany, May 19, 1965,
D 47,311
20 Claims. (Cl. 60—54)

The present invention relates to a rotor such as a turbine or pump wheel of a hydrodynamic unit, especially of a hydrodynamic coupling for vehicles, particularly motor vehicles, whereby the wheel body consists of cast material, particularly of a light metal casting.

With the known turbine wheels of the type described hereinabove, it is customary to secure, for purposes of entrainment of the driven or output shaft, a flange at an end face of the wheel body, which flange is provided in its center with a notching—or a simliar toothed sleeve part—which in turn is arranged on a corresponding toothed driven shaft and transmits to the same the torque of the turbine wheel. However, the arrangement of such a flange requires a very accurate centering thereof with respect to the wheel body. Furthermore, the wheel body, preferably cast of light metal for weight reasons, receives again a large mass and therewith an undesirably large inertia moment from the flange generally consisting of hardened steel which, for securing reasons, is kept relatively large in its radial dimensions and is therefore comparatively heavy. Therebeyond, the lateral flange connection of the entrainment sleeve at the turbine wheel body entails a comparatively large dimension of the turbine wheel in the axial direction and therewith of the entire hydrodynamic unit.

The present invention aims at eliminating all of the aforementioned disadvantages and therebeyond to achieve the further advantages to be described more fully hereinafter. The present invention solves the underlying problems in that the hub portion serving as entrainment sleeve between shaft and wheel or rotor and consisting of steel or another material of corresponding strength is provided with an externally toothed collar and that this collar is cast about on all sides thereof with the material of the wheel body.

It is recommended during the manufacture of the wheel to insert the hub portion concentrically into the casting mold for the wheel body and subsequently to cast about the same the material for the wheel body—either by pressure-die casting or by permanent mold casting. During the cooling of the liquid, light-weight metal, particularly in case of aluminum castings there results—by reason of the higher thermal coefficient of expansion of the light-weight metal compared to that of steel—a shrink-fit of the hub portion in the remaining wheel body and therewith such a rigid connection of wheel body and hub portion as cannot be realized by other securing means such as bolts and the like.

The significant advantage is achieved by the aforementioned arrangement and securing of the hub portion that the latter can be kept relatively small and therewith of light weight compared to the known, aforementioned flanges. Furthermore, the hub portion can now also be arranged coaxially in the center of the wheel body so that the wheel and therewith the entire hydrodynamic unit has a smaller axial dimension.

During the manufacture of the teeth of the hub part, one no longer needs to pay careful attention to a special accuracy in the subdivision thereof. Also as regards the construction of the teeth, great freedom is given, in principle, to the designer. However, the present invention preferably proposes as regards the construction of the toothed configuration that the teeth of the entrainment sleeve be constructed sharp-edged and that the teeth become wider radially outwardly in a wedge-like manner. This construction of the teeth according to the present invention offers, on the one hand, the advantage that a particularly intimate anchoring of the hub portion with the remaining wheel body is favored by the sharp-edged configuration of the teeth and by the widening or enlargement of the teeth in the radially outward direction. On the other hand, this tooth configuration can be manufactured in a particularly simple and rapid manner, for example, by means of a disk-shaped plain or face milling cutter which is guided radially from the outside toward the collar of the hub portion according to the so-called plunge milling method.

Prerequisite for the use of such a milling process is, of course, that the angle between the tooth flanks and the associated flat base surfaces of the tooth gaps extending in a tangential direction is no smaller than a right angle.

A further advantage of the present invention which is made possible in particular by the elimination of the aforementioned flange, customary heretofore, essentially consists in that—for the generally normal case of a support of the wheel with its shaft in a pot-shaped aperture of the other wheel—the surfaces of the first-mentioned wheel required for the bearing support may be manufactured in a simple manner and without complicated machining. In that connection, the present invention proposes in particular that the toothed collar is arranged essentially at one end of the entrainment sleeve and that the cylindrical outer surface of the entrainment sleeve is also cast about with the material of the wheel body and that this cast layer is constructed essentially also cylindrically and forms the bearing pin for the wheel or rotor. The present invention additionally proposes for an axial bearing support of the wheel that the wheel body portions axially surrounding the toothed collar form on both axial end faces facing the outside, disk-shaped surfaces which serve as axial bearing surfaces for the wheel body.

Only the radial as well as the axial bearing surfaces have to be precision-turned after cooling of the cast material whereby the apertures necessary for the run-out of the turning or machining tool may be appropriately provided already during the casting operation. Furthermore, according to the present invention, the axial bearing surfaces are each subdivided into two segments by means of radial grooves and inclined surfaces are provided on both sides of the lateral groove walls passing over into the same which possess an angle of inclination of about 15° with respect to the associated axial bearing surface. The present invention correspondingly proposes for the cast cylindrical outer surface of the bearing pin that the latter is provided with secant-like flat surfaces and that grooves are arranged in these surfaces which extend in the axial direction over the entire bearing pin and which pass over into the associated radial grooves thereof at the transition place of the bearing pin into the disk-shaped wheel body part.

The aforementioned axial as well as radial grooves serve for the guidance of the working medium of the hydrodynamic unit in the cooling circulatory system and therebeyond for the supply of the medium, which in turn, serves simultaneously as lubricant for the corresponding bearing surfaces. The lubricating capability of the medium is advantageously enhanced thereby also by the aforementioned secant-like surfaces in the cylindrical outer surface and by the inclined surfaces of the axial bearing surfaces because lubricant-pressure wedges form at these places between the bearing surfaces running one upon the other. Grooves as well as inclined surfaces and secant-like surfaces, as already mentioned above, should be provided already during the casting of the wheel body and need not be machined any longer subsequently thereto.

Accordingly, it is an object of the present invention to provide a hydrodynamic unit of the type described above which not only effectively eliminates the aforementioned shortcomings and drawbacks encountered in the prior art constructions but permits a simple and expedient manufacture as well as assembly thereof.

Another object of the present invention resides in a rotor structure for hydrodynamic units which obviates the need for accurately centered flanges secured to the rotor body and therewith eliminates need for accurately centering these parts during assembly.

A further object of the present invention resides in a hydrodynamic unit, especially for motor vehicles which may be made for the most part of light-weight metal to keep the weight low and which can be kept relatively small in its radial and axial dimensions.

Still another object of the present invention resides in a hydrodynamic unit in which undesirable inertia moments are kept relatively small.

Still a further object of the present invention resides in hydrodynamic units which can be readily manufactured with a minimum of machining and which utilizes conventional casting processes for manufacturing and assembling the various parts in a predetermined manner so as to provide a safe and secure fastening of the connection-establishing parts with the corresponding rotors of the units.

These and further objects, features, and advantages of the present invention will become more obvious from the following description when taken in connection with the accompanying drawing which shows, for purposes of illustration only, one embodiment of a hydrodynamic unit in accordance with the present invention, and wherein:

FIGURE 1 is a partial axial cross-sectional view through a hydrodynamic coupling in accordance with the present invention;

FIGURE 2 is a partial elevational view of the turbine wheel taken in the direction of arrow A in FIGURE 1, the other half being of mirror-image-like configuration;

FIGURE 3 is a partial elevational view of the turbine wheel taken in the direction of arrow B of FIGURE 1, the other half being of mirror-image-like construction;

FIGURE 4 is an axial elevational view of the hub portion of the turbine wheel according to FIGURES 1 to 3.

Referring now to the drawing wherein like reference numerals are used throughout the various views to designate like parts, and more particularly to FIGURE 1, reference numeral 10 degisnates therein the driven shaft of a hydrodynamic coupling generally desingated by reference numeral 11. The turbine wheel generally designated by reference numeral 12 is securd on the driven shaft 10. The transmission of the torque from the turbine wheel 12 to the driven shaft 10 takes place by means of a hub portion generally designated by reference numeral 14 which serves as entrainment sleeve, is provided with notched or grooved teeth 13 and consists of hardened steel. The material of the wheel body 15 is cast about the hub portion 14.

A collar 16 is disposed at one end of the hub portion 14 which is provided with sharp-edged teeth 17 (FIGS. 1 and 4) that become wider in the radially outward direction. The teeth 17 are securely anchored to the cast material by reason of the shrinkage thereof during the cooling off of the liquid casting material and transmit the torque from the wheel body 15 to the hub portion 14.

The hub portion 14 is surrounded by the cast material of the wheel body 15 on all sides thereof—except at the end faces 18 and 19 thereof—and the wheel body portions axially surrounding the toothed collar 16 form disk-shaped surfaces 20 and 21 at both axial end faces facing the outside (see, in particular FIGURES 2 and 3) while the wheel body portion surrounding the cylindrical outer surface 22 of the hub portion 14 is constructed essentially also as cylindrical surface 23. The surfaces 20, 21 and 23 are fine or precision machined after the casting, whence annually shaped apertures 24, 25, and 26 are provided for the run-out of the turning tools. The surfaces 20 and 23 serve as axial and radial bearing surfaces, respectively, for the turbine wheel 12 within the pot-shaped driving flange 27 of the pump wheel 28 surrounding the same and the surface 21 serves as axial bearing surface for the support of the turbine wheel 12 at the pump wheel 28. The drive of the flange 27 from the engine side is of any conventional nature and is therefore not illustrated and described herein.

In order to supply lubricant to the bearing surfaces 20, 21 and 23, the same are each provided with four grooves 41, 29, and 30, respectively, whereby the grooves 30 arranged at the outer surface 23 in the axial direction pass over into the radial grooves 41 in the surface 20. For purposes of the realization of lubricant pressure wedges at the bearing surfaces, the outer surface 23 is provided on both sides of the grooves 30 in a secant-like manner with plain or flat surfaces 31 and correspondingly the disk-like surfaces 20 and 21 are also provided on both sides of the grooves 41 and 29 with inclined surfaces 32 and 33. Grooves 41, 29, and 30 as well as the plain or flat surfaces 31 and inclined surfaces 32, 33 are considered and therefore formed already during the casting operation and are no longer machined after the casting.

The grooves 41, 29, and 30 serve, in addition to the supply of the lubricant to the bearing places, for the guidance of the working medium of the hydraulic coupling within a constant cooling circulator system with or without separate cooler whereby the working medium represents simultaneously the aforementioned lubricant for the bearing place. The cooled working medium enters into the radial grooves 29 through an annular gap 34 between the driven shaft 10 and the pump wheel 28 and reaches from there in part the working space 36 radially outwardly through a gap 35. A large portion of the working medium, however, flows also through the axial apertures 37 in the turbine wheel body 15 in order to establish an axial pressure equalization for the turbine wheel 10 compared to the pump wheel 28. The warmed-up working medium flows off through a gap 38 out of the working space 36 and subseqeuntly flows externally along the turbine wheel 10, radially inwardly, where it combines with the working medium stream leaving the apertures 37. It further reaches, by way of grooves 41 and 30 and through a gap 39 between the hub portion 14 and flange 27, a longitudinal bore 40 within the drive shaft 10, from where it flows back into a heat-exchanger of conventional construction and not illustrated herein.

While I have shown and described one embodiment in accordance with the present invention, it is understood that the same is not limited thereto but is susceptible of numerous changes and modifications as known to persons skilled in the art, and I therefore do not wish to be limited to the details shown and described herein but intend to cover all such changes and modifications as are encompassed by the scope of the appended claims.

I claim:

1. A rotor structure for a hydrodynamic unit, especially a hydrodynamic coupling for vehicles, comprising wheel body means of cast material, and a hub portion serving as torque-transmitting entrainment sleeve between a shaft to be connected to the rotor and the wheel body means, said hub portion consisting of a material having relatively high rigidity and being provided with an externally tooth collar, and said collar being surrounded by the material of said wheel body means which is cast about said collar on all sides thereof.

2. The combination according to claim 1, wherein said wheel body means is a turbine wheel.

3. The combination according to claim 1, wherein said wheel body means is a pump wheel.

4. The combination according to claim 1, wherein said cast material is light metal and wherein the material of said hub portion is steel.

5. The combination according to claim 1, wherein the teeth of the hub portion of the entrainment sleeve are constructed in a sharp-edged manner and become wider in a wedge-like manner in the radially outward direction.

6. The combination according to claim 5, wherein the angle between tooth flanks and the coordinated flat base surfaces of the tooth gaps extending approximately in tangential direction is at least equal to a right angle.

7. The combination according to claim 6, further comprising a shaft for said first-mentioned rotor, a second rotor, means forming a pot-shaped aperture in said second rotor, the first-mentioned rotor together with its shaft being supported in said pot-shaped aperture, the toothed collar being arranged essentially near one end of the entrainment sleeve and being provided with a cylindrical outer surface, the material of said wheel body means being also cast about the cylindrical outer surface of said entrainment sleeve, and the cast layer of said wheel body means surrounding said cylindrical outer surface being also constructed of cylindrical shape and forming the bearing pin for the first-mentioned rotor.

8. The combination according to claim 7, wherein said means forming a pot-shaped aperture is formed integral with said second rotor.

9. The combination according to claim 7, wherein said means forming a pot-shaped aperture includes a separate part connected to said second rotor.

10. The combination according to claim 7, wherein the wheel body portions surrounding the toothed collar in the axial direction form toward the outside on both sides substantially disk-shaped surfaces which serve as axial bearing surfaces for the wheel body means.

11. The combination according to claim 10, wherein the axial bearing surfaces are subdivided into segments by radial grooves, inclined surfaces being provided on both sides of the lateral walls of said grooves, the inclined surfaces passing over into the lateral groove walls and forming an angle of inclination of about 15° with respect to the associated axial bearing surfaces.

12. The combination according to claim 11, wherein the cast cylindrical outer surface of the wheel body means forming the bearing pin is provided with secant-like flat surfaces, and grooves being provided in said last-mentioned flat surfaces which extend in the axial direction over the entire bearing pin and pass over, at the transition places of the bearing pin into the substantially disk-like wheel body portion, into the asociated radial grooves thereof.

13. The combination according to claim 10, wherein the cast cylindrical outer surface of the wheel body means forming the bearing pin is provided with secant-like flat surfaces, and grooves being provided in said last-mentioned flat surfaces which extend in the axial direction over the entire bearing pin and pass over, at the transition places of the bearing pin into the substantially disk-like wheel body portion, into the associated radial grooves thereof.

14. The combination according to claim 7, wherein the cast cylindrical outer surface of the wheel body means forming the bearing pin is provided with secent-like flat surfaces, and grooves being provided in said last-mentioned flat surfaces which extend in the axial direction over the entire bearing pin and pass over, at the transition places of the bearing pin into the substantially disk-like wheel body portion, into the associated radial grooves thereof.

15. The combination according to claim 1, further comprising a shaft for said first-mentioned rotor, a second rotor, means forming a pot-shaped aperture in said second rotor, the first-mentioned rotor together with its shaft being supported in said pot-shaped aperture, the tooth collar being arranged essentially near one end of the entrainment sleeve and being provided with a cylindrical outer surface, the material of said wheel body means being also cast about the cylindrical outer surface of said entrainment sleeve, and the cast layer of said wheel body means surrounding said cylindrical outer surface being also constructed of cylindrical shape and forming the bearing pin for the first-mentioned rotor.

16. The combination according to claim 15, wherein the wheel body portion surrounding the toothed collar in the axial direction form toward the outside on both side substantially disk-shaped surfaces which serves as axial bearing surfaces for the wheel body means.

17. The combination according to claim 16, wherein the axial bearing surfaces are subdivided into segments by radial grooves, inclined surfaces being provided on both sides of the lateral walls of said grooves, the inclined surfaces passing over into the lateral groove walls and forming an angle of inclination of about 15° with respect to the associated axial bearing surfaces.

18. The combination according to claim 17, wherein the cast cylindrical outer surface of the wheel body means forming the bearing pin is provided with secant-like flat surfaces, and grooves being provided in said last-mentioned flat surfaces which extend in the axial direction over the entire bearing pin and pass over, at the transition places of the bearing pin into the substantially disk-like wheel body portion, into the associated radial grooves thereof.

19. The combination according to claim 15, wherein the cast cylindrical outer surface of the wheel body means forming the bearing pin is provided with secant-like flat surfaces, and grooves being provided in said last-mentioned flat surfaces which extend in the axial direction over the entire bearing pin and pass over, at the transition places of the bearing pin into the substantially disk-like wheel body portion, into the associated radial grooves thereof.

20. The combination according to claim 1, wherein the cast cylindrical outer surface of the wheel body means forming a bearing pin is provided with secant-like flat surfaces, and grooves being provided in said last-mentioned flat surfaces which extend in the axial direction over the entire bearing pin and pass over, at the transition places of the bearing pin into the substantially disk-like wheel body portion, into the associated radial grooves thereof.

References Cited

UNITED STATES PATENTS 2,334,282  11/1943  Peterson et al. _____ 60—54
3,330,386  7/1967   Bertram et al. _____ 60—54

EDGAR W. GEOGHEGAN, *Primary Examiner.*